May 11, 1943.  O. E. SIMMONDS  2,318,640
SPRING FASTENER
Filed June 18, 1940
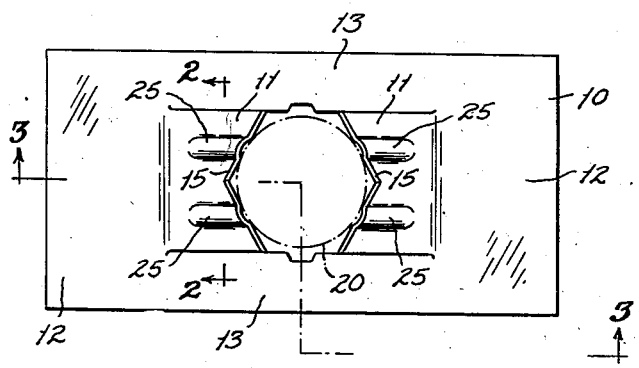
Fig. 1
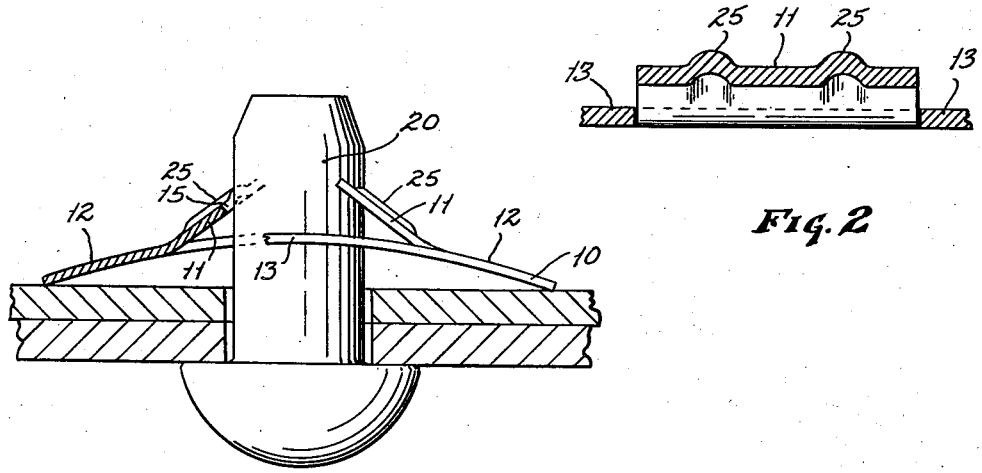
Fig. 2
Fig. 3
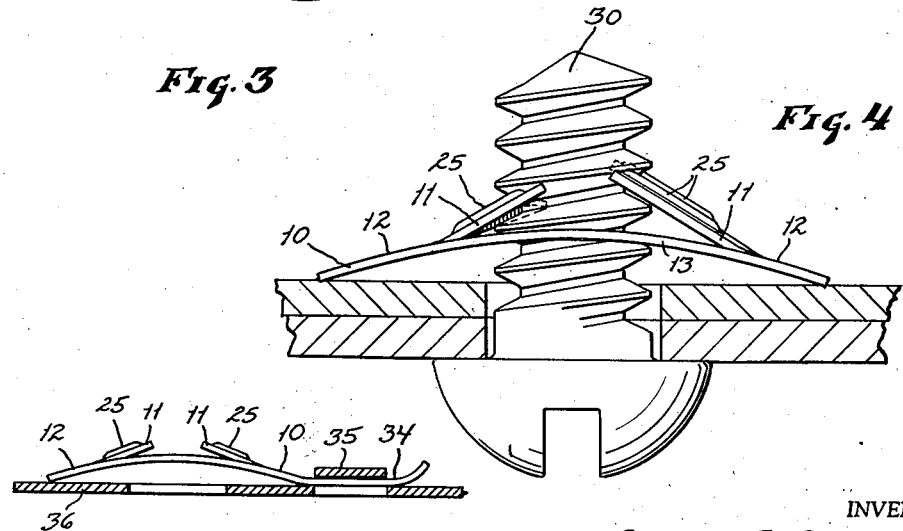
Fig. 4
Fig. 5
INVENTOR.
OLIVER E. SIMMONDS
BY Bates, Teare, & McBean
ATTORNEYS Patented May 11, 1943

2,318,640

UNITED STATES PATENT OFFICE 2,318,640

SPRING FASTENER

Oliver E. Simmonds, London, England, assignor to Tinnerman Products, Inc., Cleveland, Ohio, a corporation of Ohio Application June 18, 1940, Serial No. 341,197
In Great Britain September 7, 1939

4 Claims. (Cl. 85—36)

This invention relates to sheet metal fasteners of the kind which consist essentially of two opposed spring tongues which are adapted to grip an article, for example, the shank of a stud, inserted therebetween. One known form of fastener of this kind consists of a rectangular body of thin sheet metal having struck out therefrom two opposed tongues leaving end portions into which the ends of the tongues merge and relatively narrow bridge portions connecting the two end portions. The two tongues are bent up out of the plane of the body portion of the fastener and the adjacent free ends of the tongues formed each with a notch or recess, for example, by forming a diamond shaped aperture in the body prior to striking out the tongues therefrom, whereby the tongues may embrace the shank of a stud or like part when inserted therebetween.

When used in conjunction with a stud for securing two or more members together, the shank of the stud is passed through aligned apertures in the members and between the tongues of the fastener which is held against, or secured to, the outer surface of the outer member. As the shank is somewhat larger than the gap between the tongues they are forced apart and outwardly and since the fastener is formed of springy metal, the tongues tend to grip the shank of the stud securely, preventing reverse movement thereof. In some cases the body of the fastener is formed arched outwards and after the engagement with the shank of the stud is flattened against the member secured thereby to increase the spring tension in the tongues.

It will be appreciated that any force which acts to pull the shank of the stud out of the fastener gives a reaction which tends to pull the tongues down towards the plane of the body of the fastener. In some cases where there is a heavy load it may be necessary to strengthen the tongues by making the fastener of thicker metal. This, however, introduces disadvantages and increases their cost.

A further disadvantage of the above described form of fastener is that the tongues each contact with the shank of the stud at two points only and in some cases this may not provide a sufficiently firm grip on the shank.

An object of the present invention, therefore, is to so form the tongues of the fastener that they may be strengthened sufficiently to withstand a heavy load without increasing the thickness of the metal of which the fastener is made, and without materially increasing the cost of construction of the same. An additional object is to increase the points of contact between each tongue and the stud shank which extends through the fastener so as to double the points of contact with a round surface over any form heretofore used.

The objects enumerated are accomplished by providing on each tongue of the fastener two corrugations which are arranged one on each side of the central longitudinal axis of the tongue and extending from the free end thereof throughout its length to the junction thereof with the body of the fastener. Such corrugations are so shaped and positioned that the end of each of the tongues makes contact with the stud shank at four points spaced round the surface thereof.

Referring now to the drawing, Fig. 1 is a top plan view on an enlarged scale of a fastener made in accordance with the present invention; Fig. 2 is a section taken on a plane indicated by the line 2—2 in Fig. 1; Fig. 3 is a section taken on the line 3—3 in Fig. 1, and illustrating the fastener in applied position upon the shank of a stud with which it is intended to be used; Fig. 4 is a view showing the fastener applied to a threaded stud, and Fig. 5 is a side elevation of a fastener having a modified form of body construction.

The fastener illustrated in Figs. 1, 2 and 3 has a body indicated in general at 10 which comprises a thin sheet metal structure having struck outwardly therefrom two opposed tongues 11, which leave end portions 12, and relatively narrow bridge portions 13 connecting the two end portions. The tongues are bent up out of the plane of the body and each is provided with a notch or recess 15 adjacent the free end thereof, formed for example, by making a diamond shaped aperture in the body prior to striking out the tongues therefrom, whereby the tongues may embrace the shank 20 of a stud or like part when inserted therebetween.

To strengthen each tongue and to provide a four-point contact with the round surface of a stud shank extending through the fastener, I form two longitudinally extending corrugations 25, one on each side of the central longitudinal axis of the tongue, and I extend the corrugations from the free end of the tongues, preferably to the junction thereof with the body of the fastener. The corrugations are spaced apart laterally, as shown in Fig. 1, so as to provide engagement with a stud shank passing through the fastener on the corners which are formed by the junction of the corrugations with the wall of the recess 15. This arrangement, therefore, results in a four-point contact between each tongue and the surface of a stud shank extending through the fastener, thereby insuring a greatly improved grip between the fastener and the stud.

The stud which is shown in Fig. 3 is illustrated as having a plain cylindrical shank. My invention, however, is suitable for use with shanks of rectangular or any other cross-section, including those which may be provided with shoulders or the like against which the tongues may engage. Additionally, a fastener made in accordance with this invention may be used in conjunction with a threaded stud 30, such as are shown in Fig. 4. In such modification, the ends of the tongues are bent so as to conform readily to the helix of the thread on the stud or bolt with which the fastener is intended to be used.

A further modification of the invention is shown in Fig. 5, wherein that portion of the body adjacent the thread engaging part has an arched configuration and wherein the end portion 10 is extended horizontally at 34, a distance suitable for a specific application. This may be used, for example, for insertion beneath a lug 35 on a part 36 so as to hold the fastener in stud receiving position thereby permitting application of the fastener through a part in blind location.

It is to be understood that the modifications of Figs. 4 and 5 have the tongues and corrugations thereon made as is illustrated in Fig. 1, and described in connection therewith.

An advantage of the present invention is the fact that the tongues are capable of resisting to a greater extent the reactive force which tends to pull them downwardly toward the plane of the body, and that the fastener is, therefore, capable of carrying a heavier load without increasing the thickness of the metal of which it is made. A further advantage of the invention is the fact that the presence of the corrugation provides a four-point contact between each tongue and the surface of a stud shank which extends through the fastener. This increased contact insures a greatly improved grip between the fastener and the stud, and thereby adds materially to the value of the fastener in use.

I claim:

1. A fastener comprising a sheet metal body having a pair of tongues struck upwardly therefrom, the end of each tongue having a notch, and the notches cooperating to form a shank receiving opening, each tongue having one or more corrugations thereon extending from the free end thereof, and spaced apart sufficiently that the corners formed between the junction of each corrugation and the associated tongue provide contact points for a shank that is passed through the opening.

2. A fastener comprising a sheet metal body having a shank receiving opening therein and having a shank engaging portion tilted up therefrom and forming the opening, said portion having spaced corrugations disposed substantially parallel to each other and extending from the opening toward the body, and providing contact points for the shank of a stud passing therethrough.

3. A sheet metal fastener comprising a body having a pair of opposed tongues struck upwardly therefrom, and extending at an acute angle to the body, each tongue having a pair of corrugations thereon extending from the free end thereof, and providing contact points for the shank of a stud passing therethrough, and said body having an extension adapted to engage an article to which the fastener may be applied, for holding the fastener in position to receive the shank of an article that may be passed therethrough.

4. A fastener comprising a sheet metal plate bowed upwardly in the mid-region so that such mid-region is higher than the ends of the plate, an opening through the plate in the mid-region, and longitudinal corrugations made by bending the plate upwardly to produce opposed trough-like portions having their ends in position to engage a stud passing through the opening, the corrugations standing at an acute angle to the plane against which the fastener rests, whereby the movement of said mid-region of the fastener toward said plane causes the ends of the corrugations to bite increasingly into the stud.

OLIVER E. SIMMONDS.